United States Patent
Shannon et al.

(10) Patent No.: US 6,949,271 B2
(45) Date of Patent: Sep. 27, 2005

(54) DUST REPELLANT COMPOSITIONS

(75) Inventors: Christopher Shannon, Yulee, FL (US); Steven B. Hayes, Fernandina Beach, FL (US)

(73) Assignee: Petroferm, Inc., Ferandandina Beach, FL (US)

( * ) Notice: Subject to any disclaimer, the term of this patent is extended or adjusted under 35 U.S.C. 154(b) by 0 days.

(21) Appl. No.: 10/383,365

(22) Filed: Mar. 7, 2003

(65) Prior Publication Data

US 2003/0168642 A1 Sep. 11, 2003

Related U.S. Application Data

(60) Provisional application No. 60/362,318, filed on Mar. 7, 2002.

(51) Int. Cl.[7] .................................................. B05D 3/00
(52) U.S. Cl. ..................................... 427/385.5; 427/387
(58) Field of Search ............................... 427/385.5, 387

(56) References Cited

U.S. PATENT DOCUMENTS

| | | | | |
|---|---|---|---|---|
| 3,628,997 A | * | 12/1971 | Elkind et al. ................ 427/392 |
| 4,066,597 A | * | 1/1978 | Jager ............................ 524/98 |
| 4,076,631 A | * | 2/1978 | Caruso et al. ............. 252/8.61 |
| 4,079,042 A | * | 3/1978 | Topfl et al. .............. 525/327.7 |
| 4,143,206 A | * | 3/1979 | Jager ............................ 442/93 |
| 4,144,026 A | * | 3/1979 | Keller et al. ................. 8/115.6 |
| 4,295,976 A | | 10/1981 | Dessaint et al. ............. 252/8.9 |
| 4,473,371 A | | 9/1984 | Schinzel et al. ............. 8/115.5 |
| 4,737,156 A | * | 4/1988 | Tambor et al. ................. 8/490 |
| 4,788,287 A | | 11/1988 | Matsuo et al. ............... 544/196 |
| 4,859,754 A | | 8/1989 | Maekawa et al. ........... 526/245 |
| 4,861,501 A | | 8/1989 | Pfeifer ........................ 252/8.6 |
| 4,880,557 A | * | 11/1989 | Ohara et al. ................. 510/189 |
| 4,895,675 A | | 1/1990 | Smith .......................... 510/104 |
| 5,156,780 A | | 10/1992 | Kenigsberg et al. .......... 264/22 |
| 5,227,200 A | * | 7/1993 | LeGrow ...................... 427/387 |
| 5,281,436 A | | 1/1994 | Swidler ....................... 427/156 |
| 5,348,769 A | | 9/1994 | Gambale et al. ............. 427/387 |
| 5,428,095 A | | 6/1995 | Swidler ....................... 524/389 |
| 5,439,610 A | | 8/1995 | Ryan et al. ............. 252/174.23 |
| 5,466,770 A | | 11/1995 | Audenaert et al. ............ 528/60 |
| 5,556,833 A | | 9/1996 | Howe .......................... 510/189 |
| 5,567,756 A | | 10/1996 | Swidler ....................... 524/389 |
| 5,688,309 A | | 11/1997 | Shimada et al. ................ 106/2 |
| 5,719,221 A | | 2/1998 | Swidler ....................... 524/309 |
| 5,733,377 A | | 3/1998 | Howe ............................. 134/3 |
| 6,207,236 B1 | | 3/2001 | Araki et al. ................. 427/386 |
| 6,274,060 B1 | | 8/2001 | Sakashita et al. .......... 252/8.62 |
| 6,287,640 B1 | | 9/2001 | McClain et al. ......... 427/388.1 |

FOREIGN PATENT DOCUMENTS

| | | | |
|---|---|---|---|
| EP | 718126 | * | 6/1996 |
| JP | 06-080932 | * | 3/1994 |
| JP | 08-199199 | * | 8/1996 |
| WO | WO 2001 / 12735 | * | 2/2001 |

* cited by examiner

*Primary Examiner*—Erma Cameron
(74) *Attorney, Agent, or Firm*—Synnestvedt & Lechner LLP

(57) ABSTRACT

Sprayable, liquid polymeric film-forming compositions containing an amount of an anti-static polymer that is effective to provide films formed from the composition with resistance to the deposition of dust, soil or grime on the surface thereof, wherein the surface tension of the liquid composition is less than about 25 milli-newtons per meter. Methods for preventing the accumulation of dust, soil or grime on surfaces such as a vehicle tire, wheel or wheel cover are also disclosed.

25 Claims, No Drawings

DUST REPELLANT COMPOSITIONS

This present application claims priority from U.S. Provisional patent application Ser. No. 60/362,318 filed Mar. 7, 2002.

FIELD OF THE INVENTION

The present invention relates to a method of coating surfaces with a low surface energy anti-static film that repels dust, soil and grime in a manner that is suitable for use by a typical consumer. This invention also relates to compositions for use by consumers to repel dust, soil and grime from surfaces. The invention more particularly relates to methods and compositions for repelling dust soil and grime, and in particular brake dust, from the surface of vehicle wheel and wheel covers.

BACKGROUND OF THE INVENTION

A wide variety of automobile appearance products are used in consumer applications to maintain the original appearance of automobiles. Specifically, numerous wheel and tire cleaners are commercially available to maintain the appearance of soiled tires and metal or plastic wheels, wheel covers or hubcaps. These tire cleaners are typically acidic formulations, with pH ranges from 2 to 4. The extreme acidity is required to effectively remove brake dust, road soil and grime. These formulations also typically use anionic, amphoteric or nonionic surfactants to enhance the detergency of the tire and wheel cleaning formulation. The extremely low pH of these formulations makes their compatibility poor with many metallic wheels and most of these products are devised for use on clear-coated wheels so there is no (or very low) chance of acid corrosion. The compositions must be washed or wiped from the tires and wheels within 15 seconds to one minute to prevent damage to wheels and also to facilitate cleaning.

Fox example, U.S. Pat. No. 5,733,377, issued to Michael Howe, discloses the use of an acid composition to clean road soil and grime from wheel surfaces. This composition has the disadvantage of low pH and the use of fluoride salts which may be detrimental to the environment and human safety. Other commercial compositions that claim to remove brake dust, road soil and grime use combinations of surfactants, coupling solvents (such as 2-butoxyethanol) and/or strong organic acids such as oxalic, sulfamic, hydroxyacetic or propionic acid. Such strong acidity is required to remove the soil, dust and grime that adheres to wheel and tires substantively. In the relatively rare case of alkaline cleaning agents, a high degree of builder is again needed to loosen transportation deposits.

There exists a need for compositions that reduce the accumulation of dust, soil and grime on vehicle wheels without the use of harsh chemicals. A product that would also function to reduce dust, soil and grime accumulation on surfaces in general would be particularly desirable.

SUMMARY OF THE INVENTION

A method has now been discovered in which a composition may be applied to surfaces in general and vehicle wheels, wheel covers and tires in particular, that delivers a film that is repellant to soils, dust (including brake dust) and grime. Furthermore, the delivery method is in a manner that typical consumers can use safely to apply the film to a surface such as a wheel, wheel cover or tire. For automotive surfaces, the application of this film substantially reduces or eliminates the need for harsh acidic, caustic or solvent-borne cleaners to maintain wheel and tire appearance. This now offers consumers the ability to treat a wheel and tire once with a repellant film to maintain its appearance. Consumers can deliver the films from aerosol or trigger spray packages, gels or pre-saturated wipes.

According to one aspect of the present invention a sprayable, liquid polymeric film-forming composition is provided containing an amount of anti-static polymer that is effective to provide films formed from the composition with resistance to the deposition of dust, soil or grime on the surface thereof, wherein the surface tension of the liquid composition is less than 25 milli-newtons per meter. The low surface tension of the liquid composition provides the polymer films formed therefrom with a low surface energy that contributes to the dust, soil and grime resistance.

The present invention incorporates the discovery that anti-static polymeric films with a sufficiently low surface energy will repel dust, soil and grime in a manner heretofore unobtained in the art. The present invention further incorporates the discovery that liquid polymeric film-forming composition having surface tensions less than about 25 milli-newtons per meter will form films of anti-static polymer with the low surface energy that produces such unexpected results.

Compositions according to the present invention may be formulated from one or more of the following components:
  (A) Anti-static polymers that also contribute to lowering the surface tension of the liquid compositions, thereby lowering the surface energy of the polymeric films;
  (B) Wetting agents for lowering the surface tension of the liquid compositions and consequently the surface energy of the polymeric films—including polymeric wetting agents—that also contribute to the anti-static properties of the polymeric films;
  (C) Polymers that only contribute anti-static properties to the polymeric films;
  (D) Wetting agents that only contribute to lowering the surface tension of the liquid compositions and lowering the surface energy of the polymeric films.

One or more of the foregoing are employed, provided the resulting liquid composition has a surface tension less than about 25 milli-newtons per meter. That is, a Component A-type polymer can be used alone if it provides the resulting aqueous composition with the requisite surface tension; if not, Component B and/or Component D may be added to the composition to lower the surface tension below about 25 milli-newtons per meter. Similarly, Component B can be used alone if it provides aqueous compositions capable of forming polymer films with the anti-static properties needed to resist the deposition of dust, soil or grime. If not, Component A and/or Component C may be added to such liquid compositions to increase the anti-static properties of the resulting polymer films. Alternatively, liquid compositions may be prepared solely from combinations of Component-C-type and Component D-type materials; or, all four components may be combined to provide an liquid composition according to the present invention.

For most applications, the liquid composition will be water-based. When all the components of a given composition are water-soluble, the composition will be an aqueous solution. If one or more of the components are not water-soluble, then the composition must be formed as an emulsion by conventional techniques using emulsifying surfactants.

Compositions according to the present invention may optionally include a substantiative polymer providing water resistance to the polymeric film. Water resistance increases the durability of the films.

The quantities of composition components employed are selected to provide the compositions with the desired surface tension and the polymeric films prepared therefrom with the desired anti-static and low surface energy properties, yet at the same time maintain the viscosity of the liquid compositions low enough so that the compositions may be conveniently applied, for example by spraying and wiping. Typically, a viscosity less than 100 centipoise at room temperature is preferred unless the composition is delivered in gel form. The pH of the compositions is adjusted to maintain storage stability and to meet end-use requirements of the selected application means. This will vary depending upon the components used and the application device selected, but can be readily determined by one of ordinary skill in the art without undue experimentation.

According to another aspect of the present invention, a method is provided for preventing the accumulation of dust, soil or grime on a surface by applying a composition according to the present invention thereto so that a polymeric film coating is formed thereon resistant to the deposition of soil, dust and grime. The composition coating is left on the surface as a protective polymeric film. The composition may be applied to the surface by means of aerosol or trigger spray device, as a gel, or from a pre-saturated wipe.

Examples of some of the surfaces included within the method of the present invention include automotive surfaces, such as engine components and vehicle tires, wheels or wheel covers; optical surfaces, for which dust is a particular problem; the surface of product packages, including retail product packaging, to maintain product appearance regardless of storage duration or conditions; and household surfaces, such as furniture, floors, walls, and the like, to reduce the frequency with which such surfaces must be cleaned.

With respect to automotive applications, unlike prior art compositions that have been developed to remove brake dust, road soil and grime from tires, wheels and wheel covers, the compositions of the present invention form a protective film or barrier that is repellant to dust, soil and grime. The above and other features and advantages of the present invention will become clear from the following description of the preferred embodiment.

DETAILED DESCRIPTION OF THE PREFERRED EMBODIMENTS

The sprayable, liquid polymeric film-forming compositions of the present invention contain an amount of an anti-static polymer that is effective to form a polymeric film resistant to the deposition of dust, soil or grime on the surface thereof. The anti-static polymer components of the compositions of the present invention provide the films prepared therefrom with a negative charge sufficient to repel such dust, soil or grime. Suitable polymers include anionic polymers, as well as amphoteric and zwitterionic polymers. While amphoteric and zwitterionic polymers contain both positive and negative charges, the positive charge typically is associated with the substrate on which the polymer film is coated, providing the surface of the film with the net negative charge needed to repel dust, soil and grime.

Any non-ionic polymer that forms a negatively charged film may also be used. Examples of such non-ionic polymers include, but are not limited to, polysiloxanes, such as poly(dimethylsiloxanes) and poly(methyl hydrogen siloxanes), hydroxy-functional poly(dimethylsiloxanes), and the like. Other examples of non-ionic polymers include capped acrylates, polyamides, and acetate copolymers.

Examples of anionic polymers includes, but are not limited to, anionic silicone carboxylates, anionic fluorocarbons, poly(acrylic acids), polysulfonates, and the like.

Examples of amphoteric polymers include, but are not limited to, amphoteric fluorocarbons, amphoteric silicones, poly(amide acrylate) copolymers, polybetaines, and the like. Zwitterionic polymers suitable for use with the present invention include, but are not limited to, fluorinated carboxy betaines, fluorinated amino acids, silicone betaines, and the like.

The amount of anti-static polymer employed must be sufficient to provide the resulting polymeric films with the requisite anti-static properties, but should be below that quantity that would result in a composition viscosity too thick for the selected end-use applicator. This can be readily determined by one of ordinary skill in the art without undue experimentation. The level of anti-static polymer will range from about 0.1 to about 10 weight percent, and more typical will be in a range between about 0.5 and about 1.0 weight percent. The present invention includes all possible ranges within the broadest range defined, beginning with 0.2 weight percent, 0.3 weight percent, 0.4 weight percent, and so forth, and ending with 7 weight percent, 8 weight percent, 9 weight percent, and so forth, with ranges incorporating the levels of anti-static polymer depicted in the Examples being preferred.

A correlation has been discovered between the surface tension of the liquid composition and the surface energy of the polymeric films coated therefrom. For a film to have a surface energy low enough to effectively repel dust, soil and grime, the liquid composition must have a surface tension no greater than about 25 milli-newtons per meter. A surface tension less than about 22 milli-newtons per meter is preferred, with a surface tension less than about 20 milli-newtons per meter being even more preferred. According to the current state of the art, commercially feasible surface tensions below about 15 milli-newtons per meter are difficult to obtain. Therefore, typical compositions according to the present invention will have a surface tension between about 15 and 25 milli-newtons per meter.

The surface tension of the liquid compositions may be reduced by adding a wetting agent. The use of a wetting agent may be optional or critical depending upon the surface energy of the anti-static polymer. Wetting agents must be added to liquid compositions of anti-static polymers having a surface tension above about 25 milli-newtons per meter. They also may be optionally added to liquid composition of anti-static polymers having surface tensions below about 25 milli-newtons per meter to further reduce the surface tension.

Suitable wetting agents can be readily identified by those of ordinary skill in the art without undue experimentation. Examples include, but are not limited to, silicone compounds such as silicone copolyols, silicone sulfates, methyl hydrogen silicone emulsions, silicone oil emulsions, silicone carboxylates, silicone esters, and the like. Examples of other wetting agents include, but are not limited to, ethoxylated alcohols, sulfate and sulfosuccinate surfactants, and the like.

Polymeric wetting agents such as fluoropolymers, may also be used. Examples of fluoropolymers include poly (tetrafluoroethylene)(PTFE), ethoxylated fluorocarbons, perfluorooctanyl sulfonate derivatives, and fluorinated polyesters, and the like.

The wetting agent may also contain anionic species contributing to the anti-static properties of polymeric films formed from the liquid compositions. This includes amphoteric and zwitterionic materials, as well as anionic materials, because these materials will also express their negative charge at the polymeric film surface to repel dust, soil and grime.

Examples of polymeric wetting agents that contribute to anti-static properties include, but are not limited to, zwitterionic polymers, such as, for example, betaines, carboxy betaines, phosphobetaines, sulfobetaines, and glycinates; amphoteric polymers, such as, for example amphoteric fluorocarbons, anionic polymers, such as, for example, anionic silicones, such as fluorosilicone polyesters, fluorosiloxanes and anionic fluorocarbons such as phosphated fluorocarbons, fluoroacylates, and the like. Examples of other anionic polymer wetting agents include, but are not limited to, dioctyl sulfosuccinates, ditridecyl sulfosuccinates, and the like.

The amount of wetting agent employed is that quantity effective to reduce the surface tension of the liquid composition below about 25 milli-newtons per meter. If the liquid composition surface tension is below about 25 milli-newtons per meter without the wetting agent, then the quantity employed is optional and is that amount effective to lower the surface tension of the liquid composition. The quantity employed should not be so great as to increase the viscosity of the liquid composition above that which can be used with standard consumer-product packaging such as aerosol and trigger-spray delivery systems, aqueous and non-aqueous gels and saturated wipes. Typically, from about 0 to about 5 weight percent of the wetting agent, in addition to the anti-static polymer employed, will be used. Preferred levels of wetting agent range between about 0.1 and about 1.0 weight percent. Again, the present invention includes all possible ranges within the broadest range defined, beginning with 0.05 weight percent, 0.1 weight percent, 0.2 weight percent, and so forth, and ending with 2 weight percent, 3 weight percent, 4 weight percent, and so forth, with ranges incorporating the levels of wetting agent polymer depicted in the Examples being preferred.

The liquid compositions may also optionally include a film-forming polymer that promotes the substantivity of the polymeric film, as well as its substrate adhesion. Examples of such polymers include, but are not limited to, polyacrylates, polyurethanes, cationic polymers such as polyvinylpyrrolidone, polyamines, polyamides, and the like. An amount effective to increase the substantivity and surface adhesion of the polymeric film without increasing the liquid composition viscosity above that useful to product applications is employed. In compositions in which a substantivity and surface adhesion-promoting polymer is used, the level of such polymer will typically be between about 0.5 and about 2 weight percent, and preferably be between about 1.0 and about 1.5 weight percent. Once more, the present invention includes all possible ranges within the broadest range defined, beginning with 0.6 weight percent, 0.7 weight percent, 0.8 weight percent, and so forth, and ending with 1.25 weight percent, 1.75 weight percent, and so forth, with ranges incorporating the levels of film-forming polymer depicted in the Examples being preferred..

The substantivity and adhesion-promoting polymer may increase the surface tension of the liquid composition, making desirable the use of a surface wetting agent. If the substantivity and surface adhesion-promoting polymer increases the surface tension of the liquid composition above 25 milli-newtons per meter, then the inclusion of a surface wetting agent will be required.

When water-based, the compositions of the present invention are solutions if all of the components are water-soluble. When at least one of the components is water-insoluble, the water-based compositions are formed as emulsions instead. The emulsions are formed by essentially conventional techniques employing anionic and/or non-ionic emulsifiers. The emulsifier is selected to maintain the surface tension of the aqueous emulsion below about 25 milli-newtons per meter, otherwise the resulting polymeric film will attract, rather than repel, dust, soil and grime. For example, surfactants that have a large hydrophobic, fatty moiety, such as stearic acid or stearyl alcohol derived surfactant emulsifiers actually increase dust and soil loading on the surfaces of the polymeric films to which they have been added.

The liquid compositions of the present invention may optionally incorporate a plurality of anti-static polymers, a plurality of wetting agents, and/or a plurality of polymers contributing surface adhesion and substantivity. The liquid compositions may also optionally include one or more spreading and leveling agents, foaming agents, pH buffers, dyes, fragrances, biocides, corrosion inhibitors, and the like. The inclusion of these optional additives may also require the addition of a wetting agent to maintain the surface tension of the liquid composition below about 25 milli-newtons per meter.

The pH buffers are used to adjust the aqueous compositions pH to the level needed for long term storage stability, and also to ensure compatibility with delivery systems. For example, stainless steel cans for aerosol products require a minimum pH of 9. The pH requirements and the means by which these may be obtained can be readily determined by one having ordinary skill in the art without undue experimentation. Examples of pH buffers include acetic acid, ammonium hydroxide, phosphate buffers, monoethanolamine salts, urea salts, and the like.

The liquid compositions of the present invention are formulated for aerosol or trigger-spray delivery, or as aqueous and non-aqueous gels and saturated wipes by essentially conventional techniques that do not require description. For saturated wipes, the liquid compositions are impregnated onto a woven or a non-woven cloth. Optional additives include antioxidants, fragrances, biocides, and dyes. Gelling agents for aqueous and non-aqueous gels include, but are not limited to, acrylate resins, polyamide resins, cellulose derivatives, alginates, and silica.

Aerosol and trigger-spray delivery systems require a product having a viscosity less than about 100 centipoise at room temperature. Such compositions have a total polymer content between about 0.1 and about 5 percent by weight, and typically between about 0.5 and about 1.0 percent by weight. Intermediate polymer levels can also be used, including all possible ranges within the broadest range defined, beginning with 0.2 weight percent, 0.3 weight percent, 0.4 weight percent, and so forth, and ending with 2 weight percent, 3 weight percent, 4 weight percent, and so forth, with ranges incorporating the levels of polymer depicted in the Examples being preferred.

Compositions for aerosol delivery do not require water and may be dissolved in paraffinic solvents instead, which are conventional solvent bases for aerosol delivery of such polymers in other applications. The maximum amount of water present in a composition for trigger-spray delivery may be us to about 99% by weight.

Aqueous solutions according to the present invention are prepared simply by dissolving the polymeric component in water. When polyacrylates are used as the adhesion-promoting, substantivity-increasing polymer additive, the pH of the water must first be increased through the addition of ammonium hydroxide or other Lewis bases to dissolve the polyacrylate. This is also well know to those of ordinary skill in the art. After the polyacrylate is dissolved, the other polymer components and any other ingredients are dissolved in the solution. A final pH adjustment is then performed to bring the composition to the pH required for storage stability and delivery.

Emulsions are prepared by dissolving the water-soluble ingredients in the water component, which is then adjusted to the pH required for storage stability and the delivery system. The emulsifiers and water-insoluble components are then combined and blended with the water phase. The blend is then homogenized to form a stable emulsion.

The compositions of the present invention are either sprayed on surfaces such as vehicle tires, wheels and wheel covers using an aerosol or trigger-spray applicator, or, when formulated as aqueous or non-aqueous gels or saturated wipes, the compositions are applied by wiping onto the surface of the tire, wheel or wheel cover. The compositions of the present invention may also be applied as a step of a commercial car washing process. Regardless of how the composition is applied, excess material may be removed by wiping to leave a coating that dries to form a protective barrier film that repels dust, including brake dust, grime and soil. The compositions may be used on the tires, wheels and wheel covers of essentially any on-road or off-road vehicle, including automobiles, trucks, motorcycles, bicycles, and the like. The compositions may be dried by the application of heat or permitted to air-dry under ambient conditions.

The compositions of the present invention may be coated on essentially any surface for which a protective and dust, grime or soil repellant barrier is desired. Other examples of end-uses include the protection of optical surfaces, product packaging surfaces, household surfaces, aircraft surfaces and surfaces for grinding operations.

The following non-limiting examples set forth herein below illustrates certain aspects of the invention. All parts and percentages are by weight unless otherwise noted.

EXAMPLES

Example 1

A brake dust repellant composition was prepared containing the following components:

TABLE I

| WEIGHT PERCENT | COMMERCIAL NAME | CHEMICAL DESCRIPTION |
| --- | --- | --- |
| 0.20 | Lambent MFF 199 | silicone copolyol |
| 10.0 | L31 fluid (Crompton) | methyl hydrogen siloxane |
| 1.0 | Triton W30 | anionic emulsifier |
| 0.50 | Triton TMN-6 | non-ionic emulsifier |
|  | Acetic acid to pH 4–5 |  |

The silicone copolyol, manufactured by Petroferm of Feranandina Beach, Fla., functions as a wetting agent. The methyl hydrogen siloxane functions as an anti-static agent. The two emulsifiers were combined and then blended with the methyl hydrogen siloxane and silicone copolyol. The mixture was then blended with 88.3 weight percent water adjusted with acetic acid below pH 6. This blend was then homogenized to form a stable emulsion, which was further adjusted with acetic acid to pH 4–5. The surface tension of the composition was measured and determined to be 22 milli-newtons per meter.

Example 2

A brake dust repellant composition was prepared containing the following components:

TABLE II

| WEIGHT PERCENT | COMMERCIAL NAME | CHEMICAL DESCRIPTION |
| --- | --- | --- |
| 0.50 | Zonyl FSK (Dupont) | Amphoteric Fluorocarbon |
| 0.50 | Lambent CSI-DT(Petroferm) | Silicone Carboxylate |
| 0.80 | Avalure AC-115 (Noveon) | Acrylate Copolymer |
|  | Ammonium Hydroxide to pH 9 |  |

The amphoteric fluorocarbon functions as an anti-static agent. It also contributes to surface tension reduction and surface wetting. The silicone carboxylate functions as a wetting agent. The acrylate copolymer contributes substantivity and surface adhesion to the polymeric film.

The composition was prepared by adjusting 98.2 weight percent water to pH 9 with ammonium hydroxide. The acrylate copolymer was then dissolved after which the amphoteric fluorocarbon and silicone carboxylate were then dissolved in the solution. The pH was checked and adjusted again to 9 using ammonium hydroxide. The surface tension of the composition was measured and determined to be 19 milli-newtons per meter.

Example 3

A brake dust repellant composition was prepared using the following components:

TABLE III

| WEIGHT PERCENT | COMMERCIAL NAME | CHEMICAL DESCRIPTION |
| --- | --- | --- |
| 0.60 | PA 10 (Essential Ingredients) | Anionic fluorocarbon |
| 0.80 | Avalure AC-115 (Noveon) | Acrylate copolymer |
| 0.50 | Lambent WS-100 (Petroferm) | Silicone sulfate |
|  | Ammonium Hydroxide pH 9 |  |

The anionic fluorocarbon functions as an anti-static agent and contributes to surface wetting and surface tension reduction. The silicone sulfate functions as a wetting agent. The acrylate copolymer functions to promote substrate adhesion and substantivity. The components were combined to form an aqueous solution as in Example 2. The solution surface tension was measured at 20 milli-newtons per meter.

Evaluation

The front wheels of test vehicles with known brake dust deposition problems were coated with the compositions of Examples 1–3 using a trigger sprayer (Calmar). The color (amount of soil) of the treated areas was rated biweekly by four observers. The ratings were from 1 (no brake dust or soil deposition) to 4 (dark appearance) and were judged relative to a clean, untreated wheel of the same model and manufacturer. Ratings were taken for six weeks on treated wheels that were not washed or otherwise disturbed except for normal variations in weather and driving conditions. The results are depicted in Table IV:

TABLE IV

| COMPOSITION | WEEK | | | | | |
|---|---|---|---|---|---|---|
| | 1 | 2 | 3 | 4 | 5 | 6 |
| EXAMPLE 1 | 1 | 1 | 1.5 | 1.5 | 1.5 | 1.5 |
| EXAMPLE 2 | 1 | 1 | 1 | 1.5 | 1.5 | 1.5 |
| EXAMPLE 3 | 1 | 1.5 | 1.5 | 1.5 | 1.5 | 1.5 |

The present invention thus provides brake dust repellant compositions that form a dry, rugged film on vehicle tires, wheels and wheel covers that can be washed off with ordinary soap and water.

Example 4

A household dust repellant composition was prepared containing the following components:

TABLE V

| WEIGHT PERCENT | COMMERCIAL NAME | CHEMICAL DESCRIPTION |
|---|---|---|
| 0.20 | Lambent SW-CP-K | silicone carboxylate |
| 0.75 | Flexipel AM-100 (Essential) | Anionic Fluorinated polymer |
| 0.50 | Sokolan PA 30 CL (BASF) | Polyacrylate |

The silicone carboxylate, manufactured by Petroferm, Inc of Fernandina Beach, Fla. functions as a wetting agent and contributes to the anti-static properties of the composition. The Flexipel AM-100 functions as a polymer to lower the surface energy of the system. The Sokolan PA 30 CL functions to give substantivity to hard surfaces. The product was made into an aqueous solution by the addition of 98.55% water.

Example 5

A dust repellant composition suitable for use in optics applications was prepared containing the following components:

TABLE VI

| WEIGHT PERCENT | COMMERCIAL NAME | CHEMICAL DESCRIPTION |
|---|---|---|
| 0.10 | Lambent MFF 199SW | silicone copolyol |
| 0.45 | Flexipel AM-100 (Essential) | Anionic Fluorinated polymer |
| 0.3 | Lambent Phos A-100 | Silicone phosphate |

The silicone cpolyol, manufactured by Petroferm, Inc of Fernandina Beach, Fla. functions as a wetting agent. The Flexipel AM-100 and the Lambent Phos A-100 function as an anti-static polymer blend to lower the surface energy of the system. The Sokolan PA 30 CL functions to give substantivity to hard surfaces. The product is made into an aqueous solution by the addition of 99.15% water and the pH adjusted to 7.

The foregoing examples and description of the preferred embodiment should be taken as illustrating, rather than as limiting, the present invention as defined by the claims. As would be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A method for preventing the accumulation of dust, soil or grime on a hard surface, comprising:
    applying a layer of a liquid, water-based composition to said surface; and
    drying said layer so that an anti-static polymeric film coating is formed thereon repellant to said dust, soil and grime;
    wherein said liquid, water-based composition comprises:
    (1) an anti-static component in an amount effective to provide said polymeric film with anti-static properties sufficient to resist dust, soil and grime accumulation, wherein said anti-static component consists of one or more compounds selected from the group consisting of:
        (A) anti-static polymers that also contribute to lowering the surface tension of said liquid composition;
        (B) wetting agents for lowering the surface tension of said liquid composition that also contribute anti-static properties to said polymeric film coating; and
        (C) polymers that only contribute anti-static properties to said film coating;
    (2) a surface tension-lowering component in an amount effective to lower the surface tension of said liquid composition below about 25 milli-newtons per meter, wherein said surface tension-lowering component comprises one or more compounds selected from the group consisting of:
        (A) anti-static polymers that also contribute to lowering the surface tension of said liquid composition;
        (B) wetting agents for lowering the surface tension of said liquid composition that also contribute anti-static properties to said polymeric film coating; and
        (C) wetting agents that only contribute to lowering the surface tension of said liquid composition that also contribute anti-static properties to said polymeric film coating.

2. The method of claim 1, wherein said hard surface is an automotive surface.

3. The method of claim 2, wherein said automotive surface is a tire, wheel or wheel cover.

4. The method of claim 3, wherein said dust is brake dust.

5. The method of claim 1, wherein said surface is an optical surface.

6. The method of claim 1, wherein said hard surface is a household surface.

7. The method of claim 1, wherein said hard surface is an aircraft surface.

8. The method of claim 1, wherein said liquid, water-based composition is a water-based emulsion.

9. The method of claim 1, wherein said liquid, water-based composition is a water-based solution.

10. The method of claim 1, wherein said liquid composition has a surface tension less than about 22 milli-newtons per meter.

11. The method of claim 1, wherein said anti-static component or said surface tension-lowering component of said liquid composition comprises a wetting agent.

12. The method of claim 11, wherein said wetting agent is a polymeric wetting agent.

13. The method of claim 1, wherein said liquid composition further comprises a surface adhesion-promoting polymer.

14. The method of claim 13, wherein said surface adhesion-promoting polymer is selected from the group consisting of polyacrylates, polyurethanes and cationic polymers.

15. The method of claim 1, wherein said anti-static component of said liquid composition comprises a polar film-forming non-ionic polymer.

16. The method of claim 1, wherein said anti-static component of said liquid composition comprises an anionic, amphoteric or zwitterionic polymer.

17. The method of claim 16, wherein said anti-static component comprises an anionic fluorinated polymer.

18. The method of claim 17, wherein said surface tension-lowering component is a silicone wetting agent.

19. The method of claim 18, wherein said silicone wetting agent is a silicone carboxylate or silicone ester.

20. The method of claim 18, wherein said liquid composition further comprises a surface adhesion-promoting polymer.

21. The method of claim 20, wherein said surface adhesion-promoting polymer is a polyacyrlate.

22. The method of claim 1, wherein said anti-static component and said surface tension-lowering component of said liquid composition both comprise the same anti-static polymer that also contributes to lowering the surface tension of said liquid composition.

23. The method of claim 1, wherein said anti-static component and said surface tension-lowering component of said liquid composition both comprise the same wetting agent for lowering the surface tension of said liquid composition that also contributes anti-static properties to said polymeric film.

24. The method of claim 1, wherein said anti-static component and said surface tension-lowering component of said liquid composition are both supplied by an anti-static polymer that also contributes to lowering the surface tension of said liquid composition.

25. The method of claim 1, wherein said anti-static component and said surface tension-lowering component of said liquid composition are both supplied by a wetting agent for lowering the surface tension of said liquid composition that also contributes anti-static properties to said polymeric film.

* * * * *